United States Patent
Rink

Patent Number: 5,817,733
Date of Patent: Oct. 6, 1998

[54] POLYURETHANE RESINS, PROCESSES FOR THEIR PREPARATION, AND THEIR USE IN WATER-DILUTABLE COATING COMPOSITIONS

[75] Inventor: Heinz-Peter Rink, Münster, Germany

[73] Assignee: BASF Lacke & Farben, AG, Muenster-Hiltrup, Germany

[21] Appl. No.: 676,308

[22] PCT Filed: Jan. 7, 1995

[86] PCT No.: PCT/EP95/00056

§ 371 Date: Jul. 18, 1996

§ 102(e) Date: Jul. 18, 1996

[87] PCT Pub. No.: WO95/20001

PCT Pub. Date: Jul. 27, 1995

[30] Foreign Application Priority Data

Jan. 20, 1994 [DE] Germany .......................... 44 01 544.5

[51] Int. Cl.⁶ .................................................. C08G 18/30
[52] U.S. Cl. ................................ 528/71; 528/60; 528/85; 524/591; 428/423.1; 427/407.1
[58] Field of Search .................................. 528/71, 85, 60; 524/591; 428/423.1; 427/407.1

[56] References Cited

U.S. PATENT DOCUMENTS 4,701,480 10/1987 Markusch et al. ....................... 523/340
5,545,708  8/1996 Onwunaka et al. ...................... 528/76

FOREIGN PATENT DOCUMENTS 0 228 003 A1 12/1986 European Pat. Off. .......... B05D 7/16
0 438 090 A1  1/1991 European Pat. Off. ...... C09D 175/06

*Primary Examiner*—Rachel Gorr

[57] ABSTRACT

The present invention relates to water-dilutable polyurethane resins which are characterized in that they have been prepared using diols of the formula (I)

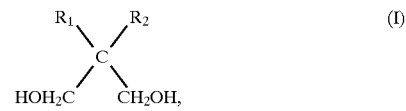

in which $R_1$ and $R_2$ are an identical or different radical and are an alkyl radical having 1 to 18 carbon atoms, an aryl radical or a cycloaliphatic radical, with the proviso that $R_1$ and/or $R_2$ may not be methyl,
and/or diols of the formula (II)

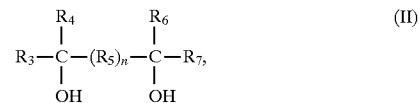

in which $R_3$, $R_4$, $R_6$ and $R_7$ are each identical or different radicals and $R_3$, $R_4$, $R_6$ and $R_7$ are an alkyl radical having 1 to 6 carbon atoms, a cycloalkyl radical or an aryl radical and $R_5$ is an alkyl radical having 1 to 6 carbon atoms, an aryl radical of an unsaturated alkyl radical having 1 to 6 carbon atoms, and n is either 0 or 1.

24 Claims, No Drawings

POLYURETHANE RESINS, PROCESSES FOR THEIR PREPARATION, AND THEIR USE IN WATER-DILUTABLE COATING COMPOSITIONS

The present invention relates to a water-dilutable polyurethane resin which is obtainable from a) at least one compound having two hydroxyl groups, b) if desired at least one compound which is different from the compound (a) and has at least 1, preferably at least 2, and less than 3 hydroxyl and/or amino groups, c) at least one di- and/or polyisocyanate, d) at least one compound which has two groups which are reactive toward isocyanate groups and at least one group capable of forming anions, which group is neutralized before or after the incorporation of component (d) into the polyurethane molecule, and e) if desired at least one compound having at least 3 hydroxyl and/or amino groups, where preferably components (a), (b), (c) and (d) have initially been used to prepare an intermediate which contains terminal isocyanate groups and at least some of whose free isocyanate groups have been reacted subsequently if desired with the component (e).

The present invention also relates to processes for the preparation of these polyurethane resins, to coating compositions which contain these polyurethane resins, to processes for the preparation of these coating compositions and to processes for the preparation of a multilayer protective and/or decorative coating on a substrate surface.

Because of ever stricter environmental regulations, the paint industry has made great efforts to reduce the organic solvents employed in coating compositions. Aqueous coating compositions have been developed which are increasingly displacing the conventional coating compositions, which contain exclusively organic solvents. In order to prepare these aqueous coating compositions it is common to employ water-dilutable binders dissolved in organic compounds. Polyurethane resins in particular have acquired a high degree of importance in this context. Even in the preparation of these water-dilutable polyurethane resin solutions in organic compounds, however, there is a demand for the polyurethane resin solution to have a minimal solvent content and a correspondingly high solids content. The demand is therefore for water-dilutable polyurethane resins, dissolved in organic compounds, which can be prepared with as high a solids content as possible.

For example, German Patent Application P 43 20 969.6, which is not a prior publication, discloses the preparation of polyurethane resins using ethoxyethyl propionate as solvent. The use of ethoxyethyl propionate in this context offers the advantage that, on the one hand, the polyurethane resins can be prepared without a stripping operation, and therefore in a cost-effective manner, and that, furthermore, the good viscosity-regulating properties of ethoxyethyl propionate and the good resistance at elevated temperatures mean that it is possible to prepare high-solids polyurethane resin solutions.

Further disclosures, for example in EP-A 438 090, relate to binder compositions for the preparation of pigment pastes and to aqueous coating compositions which contain these pigment pastes. These pigment pastes known from EP-A-438 090 contain from 20 to 50 parts by weight of a polyester-urethane resin which is obtainable by reacting a diisocyanate (A) with one or more polyesterpolyols (B), with low molecular weight diols (C) some of which have at least one acid group which is capable of forming anions, and—if desired—with low molecular weight triols (D).

In order to prepare the polyesterpolylols [sic] (B) it is possible to employ diols having sterically hindered primary hydroxyl groups, such as, for example, 2-ethyl-2-butyl-1,3-propanediol etc., to improve the hydrolysis resistance. However, EP-A-438 090 contains no information as to how very high-solids polyurethane resin solutions can be obtained.

The object of the present invention is consequently to provide water-dilutable polyurethane resins which have properties which are improved in relation to the prior art. Above all, the polyurethane resins should lead to aqueous coating compositions which, when used in basecoat/clearcoat procedures, give improved multicoat finishes.

In particular, the water-dilutable polyurethane resin solutions should be able to be prepared with as high a solids content as possible and should permit the preparation of aqueous coating compositions having a minimal content of organic solvents.

This object is surprisingly achieved by the polyurethane resins of the type indicated at the outset, which are characterized in that the component (a) which is employed comprises $a_1$) at least one diol of the formula (I)

in which $R_1$ and $R_2$ are each an identical or different radical and are an alkyl radical having 1 to 18 carbon atoms, an aryl radical or a cycloaliphatic radical, with the proviso that $R_1$ and/or $R_2$ may not be methyl, and/or $a_2$) at least one diol of the formula (II)

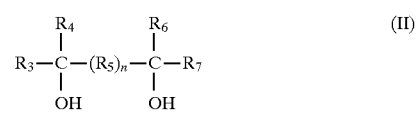

in which $R_3$, $R_4$, $R_6$ and $R_7$ are each identical or different radicals and are an alkyl radical having 1 to 6 carbon atoms, a cycloalkyl radical or an aryl radical, and $R_5$ is an alkyl radical having 1 to 6 carbon atoms, an aryl radical or an unsaturated alkyl radical having 1 to 6 carbon atoms, and n is either 0 or 1.

The present invention relates, moreover, to a process for the preparation of polyurethane resins. The present invention also relates to coating compositions containing these polyurethane resins, to processes for the preparation of these coating compositions and to the use of coating compositions in methods of coating substrates.

It is surprising and was not foreseeable that the specific use of the diols of the formulae (I) and (II) would enable the preparation of polyurethane resin solutions combining a high solids content with low viscosity. A further advantage is that the aqueous coating compositions prepared using these polyurethane resins have good mechanical properties (for example adhesion and metallic effect) which are comparable with or even better than the properties of coatings obtained using conventionally prepared polyurethane dispersions.

In the text below, the individual components for the preparation of the polyurethane resins according to the invention are first of all described in greater detail.

The starting materials which are suitable for the preparation of the polyurethane resin solutions or polyurethane dispersions, with the exception of (a₁) and (a₂), for example polyols, isocyanates, chain extenders, reactive components which are capable of forming salts, and further auxiliaries, are essentially known, and are described in, for example, the following documents:

DE-A 26 24 442, DE-A 32 10 051, EP-A 355 433, DE-A 35 45 618, DE-A 38 13 866, DE-A 40 05 961, DE-A 41 10 520 and DE-A 40 13 546. Consequently, reference is made to these documents for examples of suitable structural components of the polyurethane resins.

It is essential to the invention that the diol component (a) for the preparation of the polyurethane resins comprises a₁) at least one diol of the formula (I)

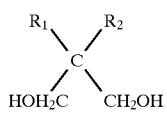

in which $R_1$ and $R_2$ are each an identical or different radical and are an alkyl radical having 1 to 18 carbon atoms, an aryl radical or a cycloaliphatic radical, with the proviso that $R_1$ and/or $R_2$ may not be methyl, and/or a₂) at least one diol of the formula (II)

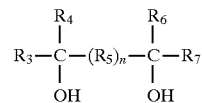

in which $R_3$, $R_4$, $R_6$ and $R_7$ are each identical or different radicals and $R_3$, $R_4$, $R_6$ and $R_7$ are an alkyl radical having 1 to 6 carbon atoms, a cycloalkyl radical or an aryl radical, and $R_5$ is an alkyl radical having 1 to 6 carbon atoms, an aryl radical or an unsaturated alkyl radical having 1 to 6 carbon atoms, and n is either 0 or 1.

Diols which are suitable as component (a₁) are all propanediols of the formula (I) in which either $R_1$ or $R_2$ or $R_1$ and $R_2$ are not both methyl, such as, for example, 2-butyl-2-ethyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethyl-bicyclo[2.2.1]heptane, 2,2-diethyl-1,3-propanediol, 2,2-dipropyl-1,3-propanediol, 2-cyclohexyl-2-methyl-1,3-propanediol et cetera.

As component (a₂) it is possible, for example, to employ 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-(2'-hydroxypropyl)benzene and 1,3-(2'-hydroxypropyl) benzene.

It is preferred to employ as component (a₁) 2-propyl-2-ethyl-1,3-propanediol, 2,2-diethyl-1,3-propanediol, 2-butyl-2-ethyl-1,3-propanediol and 2-phenyl-2-ethyl-1,3-propanediol, and, as component (a₂), 2,3-dimethyl-2,3-butanediol and 2,5-dimethyl-2,5-hexanediol. Particular preference is given to employing 2-butyl-2-ethyl-1,3-propanediol and 2-phenyl-2-ethyl-1,3-propanediol as component (a₁) and, as component (a₂), 2,5-dimethyl-2,5-hexanediol.

Components (a₁) and/or (a₂) are conventionally employed in a quantity of from 0.5 to 15% by weight, preferably from 1 to 7% by weight, the sum of the proportions by weight of components (a), (b), (d) and (e) being in each case 100% by weight.

To prepare the polyurethanes according to the invention it is also possible to employ, together with the component (a₁) and/or (a₂), other compounds which contain at least one, preferably at least two, and less than 3 hydroxyl and/or amino groups (component (b)). The compounds employed as component (b) may be of low and/or high molecular weight. Component (b) is conventionally employed in a quantity of from 50 to 97% by weight, preferably from 75 to 89% by weight, the sum of the proportions by weight of components (a), (b), (d) and (e) being in each case 100% by weight.

In order to increase the hardness of the polyurethane it is also possible to employ as component (b) other low molecular weight polyols, especially diols. They have a molecular weight of from 60 to about 400 and may contain aliphatic, alicyclic or aromatic groups.

Examples of suitable low molecular weight polyols (b) are 2,2-dimethyl-1,3-propanediol, hexanediols, butanediols, 1,4-hydroxymethylcyclohexane and neopentylglyol [sic] hydroxypivalate.

In order to obtain a polyurethane resin of high flexibility a high proportion of the component (b) comprising a predominantly linear, relatively high molecular weight polyol should be employed, having a preferred OH number of from 30 to 150 mg of KOH/g. Preferably from 50 to 100% by weight, particularly preferably from 75 to 90% by weight, of the overall component (b) consists of saturated and unsaturated polyesters and/or polyethers having a number-average molecular weight $M_n$ of from 400 to 5,000. In this context, preference is given to employing, as component (b), polyesterpolyols and/or polyetherpolyols which, in the form of a 60% strength solution in ethoxyethyl propionate at 23° C., have a viscosity of from 1.5 dpa.s to 5.0 dPa.s, preferably from 2.5 to 4.0 dPa.s (usually measured with the ICI plate/cone viscometer). It is furthermore preferred to employ polyesterpolyols and/or polyetherpolyols as component (b) which have a glass transition temperature of at least −40° C., preferably from −25° C. to +15° C.

In particular, the component (b) employed comprises preferably linear polyesterdiols and, with particular preference, linear polyesterdiols having a viscosity at 23° C. of from 1.5 to 5.0 dPa.s, preferably from 2.5 to 4.0 dPa.s (60% strength solution in ethoxyethyl propionate) and/or having a glass transition temperature of at least −40° C., preferably from −25° C. to +15° C.

The polyetherdiols and/or polyetherpolyols selected as component (b) should not introduce excessive quantities of ether groups, since otherwise the polymers formed swell in water.

The polyesterdiols (b) are prepared by esterification of organic dicarboxylic acids or their anhydrides with organic diols, or are derived from a hydroxycarboxylic acid or from a lactone. In order to prepare branched polyesterpolyols, it is possible to employ a minor proportion of polyols or polycarboxylic acids having a higher functionality.

Polyetherpolyols which can be mentioned by way of example as being suitable as component (b) are polyoxyalkylenepolyols, especially polyoxypropylene glycols having a number-average molecular weight of from 300 to 3,000.

As component (b) it is also possible to employ polyesterpolyols whose acid component consists at least partially of dimeric fatty acids. Systems of this kind are described, for example, in US-A-4,423,179.

Apart from the diols listed, compounds containing amino groups are also suitable as component (b) for the preparation of the polyurethane resin, although the diols listed are preferably employed.

Typical polyfunctional isocyanates (component (c)) which are used are aliphatic, cycloaliphatic and/or aromatic polyisocyanates having at least two isocyanate groups per molecule. It is preferred to employ the isomers or isomer mixtures of organic diisocyanates. The polyisocyanate component (c) used to form the polyurethane may also contain a proportion of more highly functional polyisocyanates, with the proviso that this does not bring about any gelling. Products which have proven suitable as triisocyanates are those which are formed by trimerization or oligomerization of diisocyanates or by reaction of diisocyanates with polyfunctional compounds contained [sic] OH or NH groups. The average functionality can be lowered if desired by addition of monoisocyanates.

High-solids polyurethane resin solutions are prepared in particular using diisocyanates of the general formula (III)

in which X is a divalent aromatic hydrocarbon radical, preferably an optionally halogen-, methyl- or methoxy-substituted naphthylene, diphenylene or 1,2-, 1,3- or 1,4-phenylene radical, particularly preferably a 1,3-phenylene radical, and $R_1$ and $R_2$ are an alkyl radical having 1–4 carbon atoms, preferably a methyl radical. Diisocyanates of the formula (III) are known (their preparation is described, for example, in EP-A-101 832, US-A-3,290,350, US-A-4,130,577 and US-A-4,439,616) and some of them are commercially available (for example, 1,3-bis-(2-isocyanatoprop-2-yl)-benzene is sold by the American Cynamid [sic] Company under the trade name TMXDI (META)$^R$).

It is preferred to employ as component (c) exclusively a diisocyanate of the formula (III) or a mixture of such diisocyanates. It is particularly preferred to employ as component (c) a diisocyanate of the formula (IV)

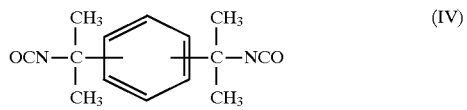

These isocyanates are also termed tetramethylxylylene diisocyanates (TMXDI). Very particular preference is given to the employment, as component (c), of a diisocyanate of the formula (IV) in which the —C(CH3)$_2$NCO [sic] groups are in the meta position (MTMXDI).

In addition to or instead of the diisocyanates of the formula (III) it is also possible to employ other aliphatic and/or cycloaliphatic and/or aromatic polyisocyanates. Examples of polyisocyanates which can be employed in addition are 1,3- and 1,4-phenylene diisocyanate, 2,4- and 2,6-tolylene diisocyanate, xylylene diisocyanate, 4,4'-bisphenylene diisocyanate, 1,4- and 1,5-naphthylene diisocyanate, diphenylmethane diisocyanate, isophorone diisocyanate, cyclopentylene diisocyanate, cyclohexylene diisocyanate, methylcyclohexylene diisocyanate, dicyclohexylmethane diisocyanate, trimethylene diisocyanate, tetramethylene diisocyanate, pentamethylene diisocyanate, hexamethylene diisocyanate, propylene diisocyanate, ethylethylene diisocyanate and trimethylhexane diisocyanate.

Polyurethanes are generally not compatible with water unless specific components are incorporated and/or particular preparation steps undertaken during their synthesis. Thus, to prepare the polyurethane resins, compounds can be used which contain two H-active groups which react with isocyanate groups, and at least one group ensures dispersibility in water (carrier groups). Suitable carrier groups are nonionic groups (e.g. polyethers), anionic groups, mixtures of these two groups, or cationic groups.

It is therefore possible to incorporate into the polyurethane resin an acid number which is large enough for the neutralized product to give a stable dispersion in water. For this purpose compounds are used which contain two H-active groups which react with isocyanate groups, and at least one group which is capable of forming anions (component (d)). Suitable groups which react with isocyanate groups are, in particular, hydroxyl groups and primary and/or secondary amino groups. Groups capable of forming anions are carboxyl, sulfonic acid and/or phosphonic acid groups. Carboxylic acid or carboxylate groups are preferably used. They should be so slow to react that the isocyanate groups of the diisocyanate react preferentially with the other groups in the molecule which are reactive toward isocyanate groups. For this purpose alkanoic acids having 2 substituents on the α carbon atom are employed. The substituent may be a hydroxyl group, an alkyl group or an alkylol group. These polyols have at least one, generally from 1 to 3, carboxyl groups in the molecule. They have from 2 to about 25, preferably from 3 to 10, carbon atoms. The polyol (d) which contains carboxyl groups and/or other groups which form anions may make up from 2 to 20% by weight, preferably from 5 to 15% by weight, of the overall polyol component ((a)+(b)+(d)+(e)) in the polyurethane resin.

The quantity of ionizable carboxyl groups which is available in salt form by means of the neutralization of the carboxyl groups is in general at least 0.4% by weight, preferably at least 0.7% by weight, based on the solids. The upper limit is about 6% by weight. The quantity of dihydroxyalkanoic acids in the non-neutralized prepolymer gives an acid number of at least 5, preferably at least 10. At very low acid numbers, further measures are generally required in order to achieve dispersibility in water.

The upper limit for the acid number lies at 70, preferably at 40, mg of KOH/g, based on the solids. The acid number is preferably within the range from 20 to 30 mg of KOH/g.

Compound (d), which contains at least 2 groups which react with isocyanate groups and at least one group capable of forming anions, is suitably, for example, dihydroxypropionic acid, dimethylolpropionic acid, dihydroxysuccinic acid or dihydroxybenzoic acid. Also suitable are the polyhydroxy acids which are obtainable by oxidation of monosacharin [sic], examples being glycolic acid, saccharic acid, mucic acid, glycuronic acid and the like.

Examples of compounds containing amino groups are a, δ-diaminovaleric acid, 3,4-diaminobenzoic acid, 2,4-diamino-5-toluenesulfonic acid, 4,4'-diamino-di-phenyl-ether-sulfonic acid and the like.

Example of tertiary amines which are suitable for the neutralization of the anionic groups are trimethylamine, triethylamine, dimethylaniline, diethylaniline, triphenylamine, dimethylethanolamine and the like. If the neutralization is carried out in the organic phase, triethylamine is preferably employed; for neutralization in the aqueous phase dimethylethanolamine is prepared.

Components (a), (b), (c) and (d) are preferably reacted first of all to give an intermediate which contains terminal isocyanate groups.

In a second step the isocyanate groups of the prepolymer which are still present are reacted with a modifying agent (e). This reaction leads, in particular, to a further linking and to an increase in the molecular weight. The quantity of this modifying agent is determined by its functionality and by the NCO content of the prepolymer. The ratio of equivalents of the active hydrogen atoms in the modifying agent to the NCO groups in the prepolymer should generally be less than 4:1 and should preferably be within the range between 3:1 and 2:1.

For the reaction with the prepolymer, the modifying agents (e) which are preferably employed are tri- and/or polyols.

However, it is also possible to employ other compounds having active hydrogen atoms as modifying agents, for example polyamines, albeit only on the precondition that the reaction of the prepolymer with the modifying agent can be carried out (can be controlled) in an organic solvent and that this reaction is not accompanied by any unwanted reactions, such as, for example, the gelling at the point of dropwise addition of the amine, which is often observed when polyamines are employed.

Examples of polyols containing at least 3 hydroxyl groups are trimethylolpropane, glycerol, diglycerol, erythritol, mesoerythritol, arabitol, adonitol, 1,2,4-butanetriol and the like. It is preferred to employ trimethylolpropane. The reaction of the prepolymer with the tri- and/or polyol is preferably controlled by way of the stoichiometry of the compounds employed such that chain lengthening occurs. Component (e) is conventionally employed in a quantity of from 0 to 15% by weight, preferably from 5 to 10% by weight, based on the overall weight of components (a), (b), (d) and (e). The polyurethane resins according to the invention commonly have a number-average molecular weight of from 1,000 to 30,000, preferably from 1,500 to 20,000 (determined in each case by gel permeation chromatography using polystyrene as standard), and an acid number of from 5 to 70 mg of KOH/g, preferably from 10 to 30 mg of KOH/g.

In order to prepare the polyurethane resin according to the invention it is preferred first of all to prepare an isocyanate-containing prepolymer from which the desired polyurethane resin is then prepared by further reaction, preferably chain lengthening. In this case the reaction of components (a), (b), (c) and (d) is carried out by the well-known methods of organic chemistry (cf. e.g.

Kunststoff-Handbuch [Polymer Handbook], Volume 7: Polyurethane [Polyurethanes], edited by Dr. Y. Oertel, Karl-Hanser-Verlag, Munich, Vienna 1983), the preferred procedure being a stepwise reaction of the components (e.g. formation of a first intermediate from components (a), (b) and (c), which is then reacted with (d) to give a second intermediate). However, the simultaneous reaction of components (a), (b), (c) and (d) is also possible. Examples of the preparation of the prepolymers are described in DE-A 26 24 442 and DE-A 32 10 051. In addition, however, the polyurethane resins can also be prepared by the simultaneous reaction of components (a), (b), (c), (d) and (e).

The reaction temperature in the preparation of the prepolymer from components (a), (b), (c) and (d) is usually up to 150° C., preferably between 80° and 150° C. and particularly preferably from 100° to 120° C. Relatively high reaction temperatures, of from 100° to 120° C., lead in this instance to a shortening of the reaction time, and are also desirable for the preparation of high-solids polyurethane resin solutions since, in this way, the resin solutions are rendered easier to handle (reduction in viscosity). The polyurethane resins can be prepared by the known methods (e.g. the acetone method, inter alia).

The reaction of components (a), (b), (c) and (d) is preferably carried out, however, in ethoxyethyl propionate (EEP) as solvent. The quantity of ethoxyethyl propionate in this case can be varied within wide limits and should be sufficient to form a prepolymer solution of appropriate viscosity. In general up to 70% by weight of solvent is employed, based on the solids, preferably from 5 to 50% by weight and particularly preferably less than 20% by weight.

Thus the reaction can, for example, be carried out in a very particularly preferred way at a solvent content of 10–15% by weight EEP, based on the solids.

If desired the reaction of components (a), (b), (c) and (d) can be carried out in the presence of a catalyst, such as organotin compounds and/or tertiary amines. For the preparation of the prepolymers the quantities of components (a), (b), (c) and (d) are chosen such that the ratio of equivalents of NCO to OH groups is between 2.0:1.0 and >1.0:1.0, preferably between 1.4:1 and 1.1:1.

The NCO prepolymer contains at least approximately 0.5% by weight of isocyanate groups, preferably at least 1% by weight of NCO, based on the solids. The upper limit lies at about 15% by weight, preferably 10% by weight and particularly preferably at 5% by weight NCO.

After their preparation the polyurethane resins according to the invention can be diluted further if desired. Examples of solvents suitable for this purpose are butoxypropanol, methoxybutanol, propylene glycol monopropyl ether, propylene glycol monoisopropyl ether, methyldiglycol and propylene glycol mono-tert-butyl ether. These solvents are selected according to the desired properties of the coating composition.

The polyurethane resin solutions prepared by the process according to the invention and diluted further if desired can be employed directly for the preparation of the base colors of a mixer system. In this case the further components of the base colors, for example pigments, conventional auxiliaries and additives and, if desired, other, additional binders and the like, are incorporated into the resulting polyurethane resin solutions, as described in DE-A 41 10 520, by methods known to those skilled in the art, by mixing and, if desired, dispersion.

To prepare water-dilutable coating compositions using the mixer system, the water-free base colors required for the desired color, and at least one water-containing pigment-free component, are then mixed shortly before the application of the coating composition.

The polyurethane resin solutions according to the invention are also suitable for the preparation of aqueous coating compositions. In this case the polyurethane resin solution is transferred to an aqueous phase by dispersing the solution in water by methods which are well known to those skilled in the art. When ethoxyethyl propionate is used as solvent for the preparation of polyurethane resins, the distillative removal of the ethoxyethyl propionate used as solvent is unnecessary, in contrast to the case with polyurethane resin solutions prepared according to conventional processes. The ethoxyethyl propionate can instead remain in the coating composition.

It may if desired be advantageous to add further cosolvents to the aqueous coating composition obtained. Particularly suitable in this context is butoxypropanol, since the use of butoxypropanol as cosolvent achieves outstanding application results and outstanding optical and mechanical properties of the resulting coating. In addition, other solvents may also—depending on the intended use and the profile of requirements of the coating composition—be suitable as cosolvents, examples being 3-methoxybutanol, propylene glycol monopropyl ether, propylene glycol mono-tert-butyl ether, propylene glycol monoisopropyl ether and butylglycol.

In order to prepare aqueous coating compositions it is also possible, however, first to dilute the polyurethane resins further using the abovementioned cosolvents, and then to disperse these dilute polyurethane resin solutions in water by methods which are well known to those skilled in the art. In this way, depending on the cosolvents chosen, dispersion in water may be made easier.

The preparation of the aqueous coating compositions from the polyurethane dispersions prepared in accordance with the invention, by incorporation of the other components such as, for example, pigments, auxiliaries and additives, further binders and the like, is carried out by well-known methods which are conventional, and therefore requires no further description.

Commonly the quantity of other, additional binders which is used is between 0 and 8% by weight, that of the pigments is between 1 and 6% by weight and that of the conventional auxiliaries and additives is between 0 and 5% by weight, based in each case on the overall weight of the coating composition and on the respective solids content.

The polyurethane dispersions according to the invention are particularly suitable for use in coating compositions which are used to prepare multilayer coatings.

The present invention therefore also relates to a process for the preparation of a multilayer protective and/or decorative coating on a substrate surface, in which 1.) a basecoating composition is applied,
2.) a polymer film is formed on the surface from the composition applied in step (1),
3.) a transparent topcoat is applied to the basecoat obtained in this way, and
4.) the topcoat is cured together with the basecoat.

The process is characterized in that the basecoating composition applied in step (1) and/or the topcoat applied in step (3) contains a polyurethane resin according to the invention.

Furthermore, the aqueous polyurethane dispersions according to the invention are particularly suitable for the preparation of aqueous coating compositions for the coating of motor-car bodies (production-line finishing) and/or plastics components. They can also be applied, however, to other substrates, for example glass, metals, wood and the like.

In addition they are preferably employed for the preparation of water-dilutable repair coating materials, especially in the area of automotive refinishing. They are particularly well suited to the preparation of aqueous basecoats for the refinishing of motorcars. Besides this, however, the polyurethane dispersions prepared in accordance with the invention also have a wide variety of other applications, ranging from adhesives via leather-finishing compositions to coating compositions for a very wide variety of applications, for example as fillers or coating materials for industrial goods, large-scale machinery etc.

The coating compositions according to the invention are commonly cured at temperatures of from 60° to 130° C., preferably from 60° to 80° C.

The invention is now illustrated in more detail with reference to examples. All parts and percentages in these examples are by weight, unless expressly stated otherwise.

Polyesterdiol A

In an apparatus which is common for the polyester synthesis, 371.2 g of Pripol 1013 (commercial dimeric fatty acid having a monomer content of not more than 0.1%, a trimer content of not more than 2%, an acid number of from 195 to 198 mg of KOH/g and a hydrolysis number of 198–202 mg of KOH/g), 107.7 g of cyclohexanedimethanol, 723.3 g of neopentylglycol hydroxypivalate, 17.2 g of ethylbutylpropanediol, 392.6 g of neopentylglycol and 1018.7 g of isophthalic acid are reacted, together with cyclohexane as entraining agent and 0.25 g of monobutyltin oxide hydrate, down to an acid number <5.0. The cyclohexane was distilled off and reaction of the polyester continued down to an acid number of <1.5. The batch was cooled to about 100° C. and diluted to 75.7% with methyl ethyl ketone. The polyesterdiol A has an $M_n$ of 2352 (measured using GPC against a polystyrene standard) and a glass transition temperature (measured by DSC—Differential Scanning Calorimetry) of −16° C. The viscosity of a 60% strength solution in ethoxyethyl proponate [sic] at 23° C. is 3.5 dPa.s.

Polyesterdiol B

In an apparatus which is common for the polyester synthesis, 371.2 g of Pripol 1013, 107.7 g of cyclohexanedimethanol, 723.3 g of neopentylglycol hydroxypivalate, 17.2 g of ethylbutylpropanediol, 392.6 g of neopentylglycol and 1018.7 g of isophthalic acid are reacted, together with cyclohexane as entraining agent and 0.25 g of monobutyltin oxide hydrate, down to an acid number <5.0. The cyclohexane was distilled off and reaction of the polyester continued down to an acid number of <1.5. The batch was cooled to about 100° C. and diluted to 79.5% with ethoxyethyl propionate. The polyesterdiol B has an $M_n$ of 2352 (measured using GPC against a polystyrene standard) and a glass transition temperature (measured by DSC) of −16° C. The viscosity of a 60% strength solution in ethoxyethyl proponate [sic] at 23° C. is 3.5 dpa.s.

EXAMPLE 1

Preparation of the polyurethane resin 1

In a 5 l reaction vessel with stirrer, reflux condenser a mixture of 971.7 g of the polyesterdiol A, 13.5 g of 2-butyl-2-ethyl-1,3-propanediol, 60.8 g of dimethylolprop-ionic acid and 307.1 g of tetramethylxylylene diisocyanate and 137.1 g of methyl ethyl ketone was heated to a reaction temperature of 80°–85° C., until a constant NCO value of the mixture was reached. Subsequently, per mole of diisocyanate prepolymer, 2.4 times the molar quantity of trimethylolpropane was added and reaction was continued until the isocyanate content was virtually zero. 370 g of butylglycol were added to the mixture, and the methyl ethyl ketone was very substantially removed by the stripping process (refractive index of the distillate <1.340). The batch was subsequently neutralized with 30.3 g of N,N-dimethylethanolamine. The solids content of the mixture was adjusted to 60% with butylglycol. The acid number of the resin was 20.9 mg of KOH/g and the viscosity (10:3 in N-methylpyrollidone [sic]) 11.5 dpa.s (ICI plate/cone viscometer, 23° C.).

Comparison Example 1

Preparation of the polyurethane resin C1

A polyurethane resin C1 was prepared analogously to Example 1, the only difference being that 8.8 g of neopentylglycol were employed in this case instead of 13.5 g of 2-butyl-2-ethyl-1,3-propanediol. The acid number of the polyurethane resin Cl is 21.0 mg of KOH/g. The viscosity (10:3 of the [sic] polyurethane resin solution C1 diluted with N-methylpyrrolidone and adjusted to a solids content of 60% with butylglycol) is 13.5 dPa.s, measured at 23° C. with the ICI plate/cone viscometer.

EXAMPLE 2

Preparation of the polyurethane resin 2

In a 5 l reaction vessel with stirrer, reflux condenser a mixture of 728.9 g of the polyesterdiol B, 10.9 g of 2-butyl-2-ethyl-1,3-propanediol, 47.9 g of dimethylolprop-ionic acid and 241.9 g of tetramethylxylylene diisocyanate was heated to a reaction temperature of 115° C., until a constant NCO value of the mixture was reached. Subsequently, per mole of diisocyanate, 2.2 times the molar quantity of trimethylolpropane was added, and reaction was continued until the isocyanate content was virtually zero. The mixture was diluted with 500 g of butoxypropanol, and 23.9 g of dimethylethanolamine were added in one portion at a temperature of 100° C. Finally, the mixture was adjusted to a solids content of 60% with butoxypropanol. The binder has an acid number of 20.6 mg of KOH/g and a viscosity (10:3 in N-methylpyrrolidone) of 13.5 dpa.s.

EXAMPLE 3

Preparation of the polyurethane resin 3

A polyurethane resin 3 was prepared analogously to Example 2, the only difference being that 9.7 g of 2,5-dimethyl-2,5-hexanediol were employed this time instead of 10.9 g of 2-butyl-2-ethyl-1,3-propanediol.

The polyurethane resin 3 has an acid number of 21.5 mg of KOH/g and a viscosity (10:3 in N-methylpyrrolidone) of 14.5 dPa.s

EXAMPLE 4

Preparation of the polyurethane resin 4

In a 5 l reaction vessel with stirrer and reflux condenser a mixture of 728.9 g of the polyesterdiol B, 11.0 g of 2-phenyl-2-methyl-1,3-propanediol, 47.9 g of dimethylolpropionic acid and 241.9 g of tetramethyl-xylylene diisocyanate was heated to a reaction temperature of 115° C. until a constant NCO value of the mixture was reached.

Subsequently, per mole of diisocyanate, 2.2 times the molar quantity of trimethylolpropane were added, and reaction was continued until the isocyanate content was virtually zero. The mixture was diluted with 500 g of butoxypropanol, and 23.9 g of dimethylethanolamine were added in one portion at a temperature of 100° C. Finally, the solids content was adjusted to 60% with butoxypropanol. The binder had an acid number of 21.2 mg of KOH/g and a viscosity (10:3 in N-methylpyrrolidone) of 13.5 dpa.s.

EXAMPLE 5

Preparation of a polyurethane resin dispersion

In a 5 l reaction vessel with stirrer and reflux condenser a mixture of 895.5 parts of the polyesterdiol B, 4.4 parts of neopentylglycol, 64.0 parts of dimethylolpropionic acid and 268.5 parts of tetramethylxylxylene diisocyanate is heated at a reaction temperature of 115° C. until a constant NCO value of the mixture is reached. Subsequently, per mole of diisocyanate, 1.88 times the molar quantity of trimethylolpropane is added and reaction is continued until the isocyanate content is virtually zero. After the addition of 38.2 parts of N,N-dimethylethanolamine at 110° C. the mixture is stirred for half an hour. Deionized water is then added at 80° C. and the solids content is adjusted to 35.8%. The pH of the dispersion was 7.4. The dispersion is stable for a relatively long time at room temperature.

Comparison Example 2

Preparation of the polyurethane resin C2

A polyurethane resin C2 was prepared analogously to Example 2, the only difference being that 6.9 g of neopentylglycol were employed in this case instead of 10.9 g of 2-butyl-2-ethyl-1,3-propanediol.

The polyurethane resin C2 has an acid number of 21.5 mg of KOH/g and a viscosity (10:3 in N-methylpyrrolidone) of 15.0 dpa.s.

Preparation of the Pigment-free mixture B1

43 parts of a preswollenly [sic] aqueous paste containing 3% by weight of an inorganic sodium magnesium phyllosilicate thickener and 3% by weight of polypropylene glycol having a number-average molecular weight of 900, the percentages being based on the overall weight of the paste, 19.8 parts of deionized water, 0.5 parts of a commercially available defoaming agent and 3.5 parts of a 3.5% solution of a commercially available polyurethane thickener in water are added with stirring to 33.2 parts of the polyurethane resin dispersion from Example 5.

Preparation of a blue-pigmented base color A1

12 parts of Paliogen blue, 50 parts of the 60% strength neutralized polyurethane resin solution 2, 23 parts of butylglycol and 15 parts of iso-butanol are mixed with stirring and dispersed using a sand mill.

Preparation of an aluminum-containing base color A2

27 parts of an aluminum bronze chromated in accordance with DE-A 3 636 183 (aluminum content 65%, average particle diameter 15 μm) are homogeneously distributed in 6.6 parts of butylglycol, 23.6 parts of the 60% strength polyurethane resin solution 2 and 13.6 parts of iso-butanol, by stirring for 15 minutes, and the mixture is then run with stirring into 29.2 parts of the 60% strength neutralized polyurethane resin solution 2. This mixture is stirred for a further 30 minutes with a high-speed stirrer at 1000 rpm.

Preparation of the coating compositions I to V

The polyurethane resin solution 2 and the polyurethane resin dispersion from Example 5 are used to prepare aqueous coating compositions, by stirring the base color A1 or A2, directly after its preparation, into the mixture B1.

The viscosity is subsequently adjusted to a flow time of about 25 sec. DIN 4 cup (20° C.).

TABLE

Composition of the aqueous basecoating compositions I to V, in parts

| | Example | | | | |
|---|---|---|---|---|---|
| | I | II | III | IV | V |
| A2 | 19.— | 14.25 | 12.7 | 9.5 | 6.3 |
| A1 | — | 4.25 | 5.7 | 8.5 | 11.3 |
| B1 | 81.— | 81.5 | 81.6 | 82.— | 82.4 |
| | 100.— | 100.— | 100.— | 100.— | 100.— |

Directly following the preparation of the aqueous basecoating compositions, they are sprayed by well-known methods onto phosphatized steel panels (Bonder 132) which have been coated with a commercially available electrodeposition coating and a conventional (i.e. solvent-containing) or water-containing filler, are coated after a flash-off time of 30 minutes at room temperature (at a relative atmospheric humidity of 50% and a room temperature of 20° C.) with a commercially available, conventional 2-component clearcoat based on an acrylate copolymer containing hydroxyl groups and on an isocyanate crosslinking agent, and are dried at 60° C. for 30 minutes. The dry film thickness of the basecoating composition is ~15 μm, that of the clearcoat is ~50 μm.

Coatings are obtained which, with regard to the metallic effect, the adhesion and the freedom from clouding, correspond to the coatings described in DE-A-41 10 520.

I claim:

1. Water-dilutable polyurethane resin comprising the reaction product of
   a) at least one compound having two hydroxyl groups,
   b) optionally at least one compound which is different from tile compound (a) and has at least 1, and less than 3 hydroxyl and/or amino groups,
   c) at least one di- and/or polyisocyanate,
   d) at least one compound which has two groups which are reactive toward isocyanate groups and at least one group capable of forming anions, wherein the anionic group is neutralized before or after the incorporation of component (d) into the polyurethane molecule, and e) optionally at least one compound having at least 3 hydroxyl and/or amino groups, where components (a), (b), (c) and (d) are reacted to form an intermediate which contains terminal isocyanate groups and wherein component (a) comprises a compound selected from the group consisting of $a_1$) at least one diol of the formula (I)

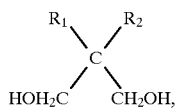

wherein $R_1$ and $R_2$ are identical or different radicals selected from the group consisting of alkyl radicals having 1 to 18 carbon atoms, aryl radicals, and cycloaliphatic radicals, with the proviso that $R_1$ and/or $R_2$ may not be methyl, $a_2$) at least one diol of the formula (II)

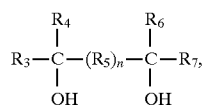

in which $R_3$, $R_4$, $R_6$ and $R_7$ are each identical or different radicals and $R_3$, $R_4$, $R_6$ and $R_7$ are selected from the group consisting of alkyl radicals having 1 to 6 carbon atoms, cycloalkyl radicals and aryl radicals, and $R_5$ is a radical selected from the group consisting of alkyl radicals having 1 to 6 carbon atoms, aryl radicals, and unsaturated alkyl radicals having 1 to 6 carbon atoms, and n is either 0 or 1, and mixtures of (a1) and (a2).

2. Water-dilutable polyurethane resin according to claim 1, wherein component ($a_1$) is selected from the group consisting of 2-butyl-2-ethyl-1,3-propanediol, 2-phenyl-2-methyl-1,3-propanediol, 2-propyl-2-ethyl-1,3-propanediol, 2-butyl-2-propyl-1,3-propanediol, 1-dihydroxymethyl-bicyclo(2.2.1)- heptane, 2,2-diethyl- 1,3-propanediol, 2,2-dipropyl-1,3-propanediol and/or 2-cyclohexyl-2-methyl-1, 3-propanediol, and component ($a_2$) is selected from the group consisting of 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-(2'-hydroxypropyl)- benzene and 1,3-(2'-hydroxypropyl)benzene.

3. Water-dilutable polyurethane resin according to claim 1 wherein component (b) comprises at least in part a compound selected from the group consisting of polyesterpolyol, polyetherpolyol, and mixtures thereof having a glass transition temperature of at least −40° C.

4. Water-dilutable polyurethane resin according to claim 1, wherein component (b) is selected from the group consisting of polyester-diols, polyether-diols, and mixtures thereof having a number-average molecular weight of from 400 to 5,000.

5. Water-dilutable polyurethane resin according to claim 1, wherein component (c) is a diisocyanate of the formula (III)

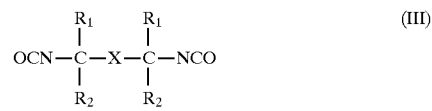

in which X is a divalent, aromatic hydrocarbon radical, and $R_1$ and $R_2$ are an alkyl radical having 1 to 4 carbon atoms.

6. Water-dilutable polyurethane resin according to claim 1, wherein component ($a_1$) is 2-butyl-2-ethyl-1,3-propanediol.

7. Water-dilutable polyurethane resin according to one of claims 1 to 6, characterized in that claim 1, wherein the polyurethane resin is obtained from 0.5 to 15% by weight of the component (a), the sum of the percentages by weight of components (a), (b), (d) and (e) being in each case 100% by weight.

8. Process for the preparation of polyurethane resins, comprising reacting a) at least one compound having two hydroxyl groups, b) optionally at least one compound which is different from the compound (a) and has at least one, and less than three hydroxyl and/or amino groups, c) at least one di- and/or polyisocyanate, d) at least one compound which has two groups which are reactive toward isocyanate groups and at least one group capable of forming anions, where the group capable of forming ions is neutralized before or after the incorporation of component (d) into the polyurethane molecule, and e) at least one compound having at least 3 hydroxyl and/or amino groups, where components (a), (b), (c) and (d) are initially reacted to form an intermediate which contains terminal isocyanate groups wherein component (a) comprises a compound selected from the group consisting of $a_1$) at least one diol of the formula (I)

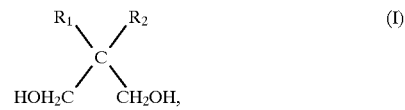

wherein $R_1$ and $R_2$ are identical or different radicals selected from the group consisting of alkyl radicals having 1 to 18 carbon atoms, aryl radicals, and cycloaliphatic radicals, with the proviso that $R_1$ and/or $R_2$ may not be methyl, $a_2$) at least one diol of the formula (II)

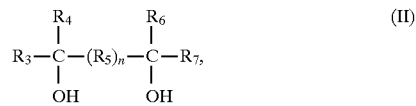

in which $R_3$, $R_4$, $R_6$ and $R_7$ are each identical or different radicals and $R_3$, $R_4$, $R_6$ and $R_7$ are selected from the group consisting of alkyl radicals having 1 to 6 carbon atoms, cycloalkyl radicals and aryl radicals, and $R_5$ is a radical selected from the group consisting of alkyl radicals having 1 to 6 carbon atoms, aryl radicals, and unsaturated alkyl radicals having 1 to 6 carbon atoms, and n is either 0 or 1, and mixtures of (a1) and (a2).

9. Coating composition comprising as a binder, the polyurethane resin of claim 1.

10. Process for the preparation of a multilayer protective and/or decorative coating on a substrate surface, comprising 1.) applying a basecoating composition to a substrate surface,
2.) forming a polymer film on the surface from the composition applied in step (1),
3.) applying a transparent topcoat to the basecoat, and
4.) curing the topcoat together with the basecoat, wherein the basecoating composition applied in step (1) contains a polyurethane resin according to claim 1.

11. Substrate coated with a single-layer or multilayer coating, characterized in that at least one of the layers of the coating contains a polyurethane resin according to claim 1.

12. A binder for a water-dilutable coating composition, comprising the polyurethane resin according to claim 1.

13. The water-dilutable polyurethane resin according to claim 1 wherein the polyurethane is the reaction product of the intermediate formed by reacting the intermediate formed by reacting (a)–(d), with component (e).

14. The process of claim 8 wherein the intermediate formed by reacting (a)–(d), is reacted with component (c).

15. Water-dilutable polyurethane resin according to claim 1 wherein component (b) comprises at least in part a compound selected from the group consisting of polyesterpolyol, polyetherpolyol, and mixtures thereof wherein the 60% strength solution of component (b) in ethoxyethyl propionate has a viscosity at 23° C. of from 1.5 to 5.0 dPa.s.

16. Water-dilutable polyurethane resin according to claim 3 wherein a 60% strength solution of component (b) in ethoxyethyl propionate has a viscosity at 23° C. of from 1.5 to 5.0 dPa.s.

17. The water-dilutable polyurethane resin according to claim 5, employing as component (c), the diisocyanate represented by formula III wherein X is selected from the group consisting of naphthylene radicals substituted with substituents selected from the group consisting of halogen-, methyl- and methoxy-substituents; biphenylene radicals; 1,2-phenylene radicals; 1,3-phenylene radicals; and 1,4-phenylene radicals; and $R_1$ and $R_2$ are an alkyl radical having 1 to 4 carbon atoms.

18. Water-dilutable polyurethane resin according to claim 1, wherein component ($a_2$) is 2,5-dimethyl-2,5-hexanediol.

19. Water-dilutable polyurethane resin according to claim 1, wherein component (c) which has been employed is a diisocyanate of the formula (IV)

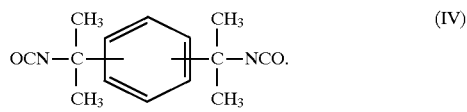

20. Water-dilutable polyurethane resin according to claim 1, wherein component (a) is selected from the group consisting of component ($a_1$) 2-butyl-2-ethyl-1,3-propanediol, component ($a_2$) 2,5-dimethyl-2,5-hexanediol, and mixtures thereof, and component (c) is a diisocyanate of the formula (IV)

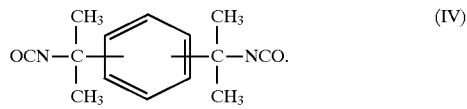

21. A binder for a water-dilutable coating composition for automobile bodies and plastics components, comprising the polyurethane resin according to claim 1.

22. A binder for an automotive refinish coating composition comprising the polyurethane resin according to claim 1.

23. Water-dilutable polyurethane resin according to claim 3 wherein component (b) comprises at least in part a compound selected from the group consisting of polyesterpolyol, polyetherpolyol, and mixtures thereof having a glass transition temperature of from −25° to +15° C.

24. Water-dilutable polyurethane resin comprising the reaction product of a) at least one compound having two hydroxyl groups,
b) optionally at least one compound which is different from the compound (a) and has at least 1, and less than 3 hydroxyl and/or amino groups,
c) at least one di- and/or polyisocyanate,
d) at least one compound which has two groups which are reactive toward isocyanate groups and at least one group capable of forming anions, wherein the anionic group is neutralized before or after the incorporation of component (d) into the polyurethane molecule, and
e) optionally at least one compound having at least 3 hydroxyl and/or amino groups, where components (a), (b), (c) and (d) are reacted to form an intermediate which contains terminal isocyanate groups and wherein component (a) comprises 2,5-dimethyl-2,5-hexanediol.

* * * * *